United States Patent [19]

Swanson et al.

[11] 4,335,561
[45] Jun. 22, 1982

[54] HEADER HEIGHT POSITION CONTROL FOR A COTTON HARVESTER

[75] Inventors: William C. Swanson; Jesse H. Orsborn, both of Clarendon Hills, Ill.

[73] Assignee: International Harvester Co., Chicago, Ill.

[21] Appl. No.: 210,986

[22] Filed: Nov. 28, 1980

[51] Int. Cl.³ .................... A01D 46/20; A01D 47/00; A01D 46/10
[52] U.S. Cl. ............................ 56/10.2; 56/11.9; 56/DIG. 15
[58] Field of Search ................ 56/10.2, 11.9, 208, 56/DIG. 10, DIG. 11, DIG. 15

[56] References Cited

U.S. PATENT DOCUMENTS

| | | | |
|---|---|---|---|
| 2,949,924 | 8/1960 | Cochran, Jr. | 137/99 |
| 3,196,599 | 7/1965 | Meiners et al. | 56/208 |
| 3,309,852 | 3/1967 | Allen | 56/208 |
| 3,566,587 | 3/1971 | Janssen | 56/10.2 |
| 3,568,420 | 3/1971 | Hofer et al. | 56/208 |
| 3,992,858 | 11/1976 | Hubbard et al. | 56/11.9 |
| 4,009,555 | 3/1977 | Temple | 56/10.2 |
| 4,229,931 | 10/1980 | Schlueter et al. | 56/208 |

FOREIGN PATENT DOCUMENTS

| | | | |
|---|---|---|---|
| 682167 | 8/1979 | U.S.S.R. | 56/11.9 |
| 743623 | 6/1980 | U.S.S.R. | 56/DIG. 15 |

Primary Examiner—Paul J. Hirsch
Attorney, Agent, or Firm—J. W. Gaines; F. D. Au Buchon

[57] ABSTRACT

A cotton harvester (10) is provided with several independently hydraulically adjustable header units (16) that are movable in unison or completely independently responsive to ground plane elevation. A rotary flow divider (30) is positioned between a manual control valve (32) and the header units to control synchronous movement of the units. A plurality of one way check valves (44 and 104) are positioned between the manual control valve and the rotary flow divider (30) and the header units respectively for prioritizing fluid flow from the manual control valve to the adjustable header units.

15 Claims, 5 Drawing Figures

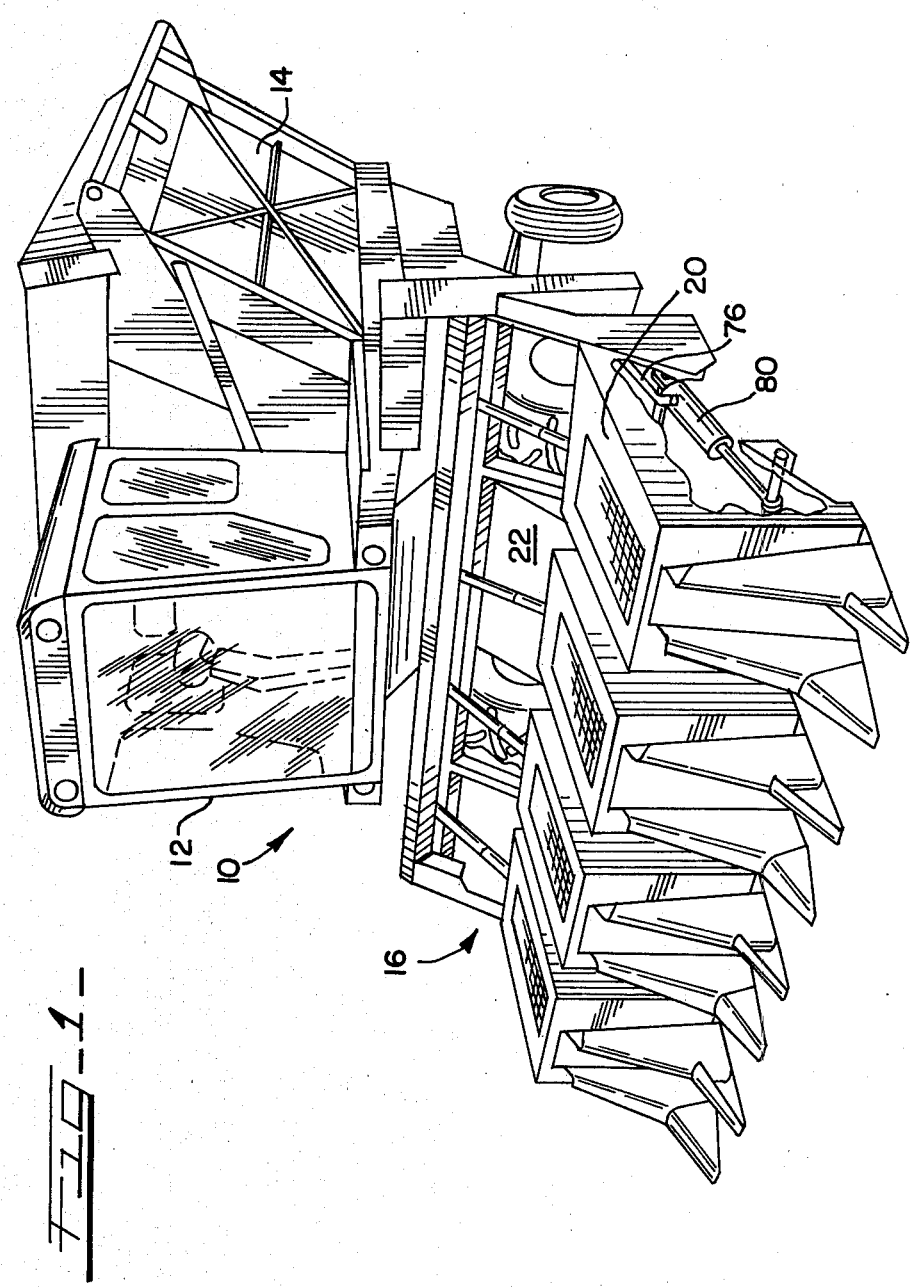

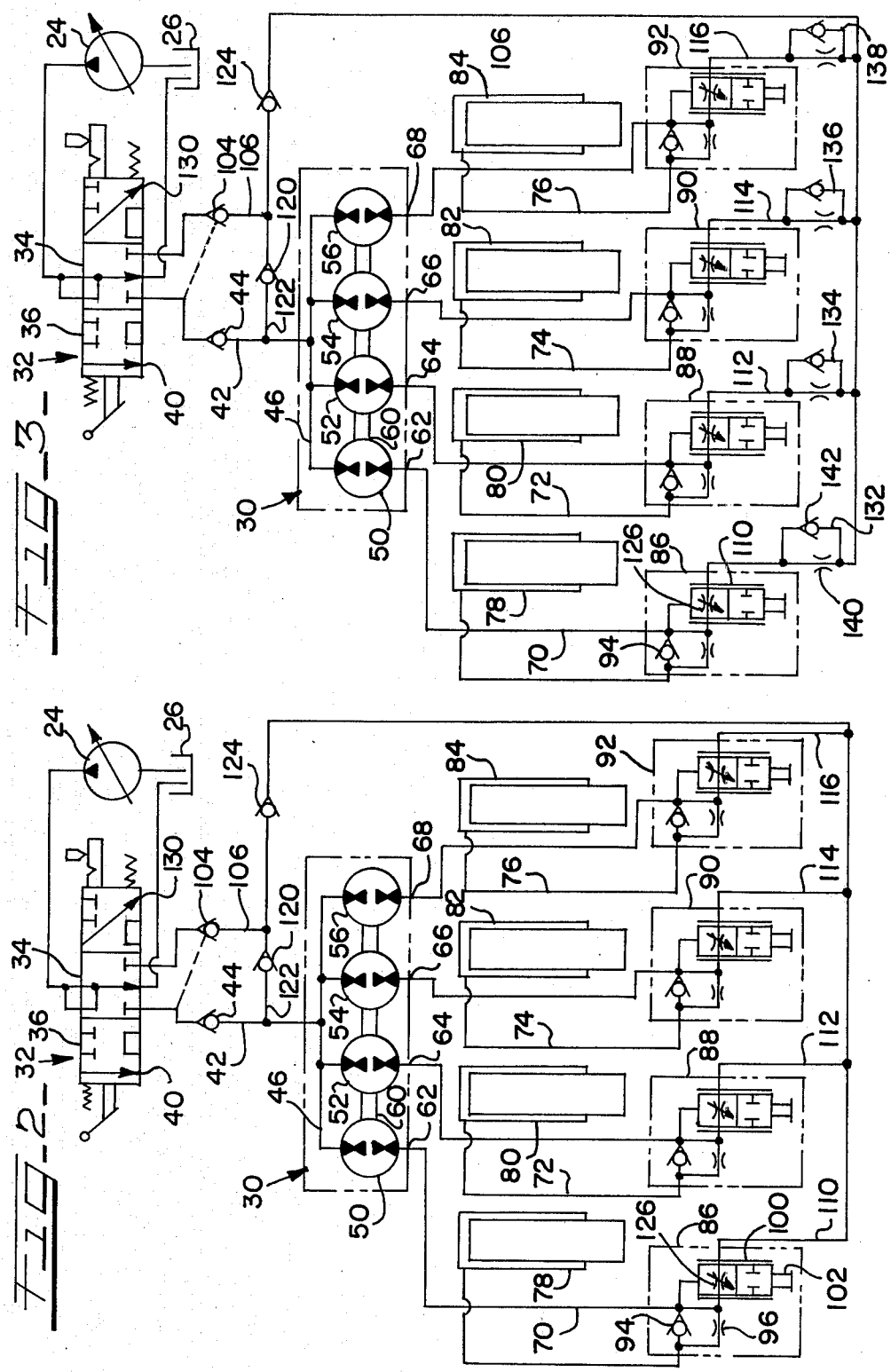

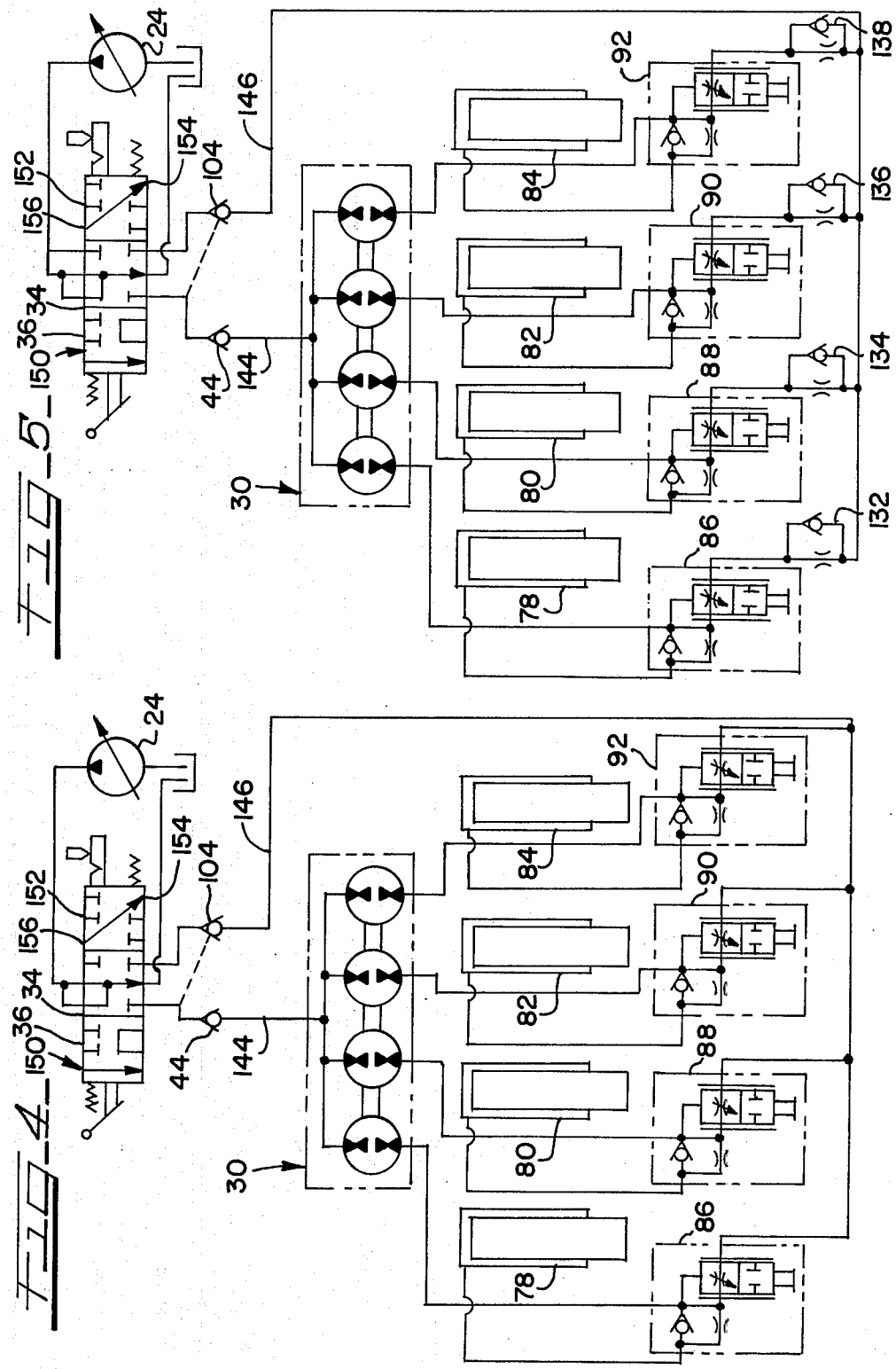

HEADER HEIGHT POSITION CONTROL FOR A COTTON HARVESTER

CROSS REFERENCES TO RELATED APPLICATIONS

This application is related to application Ser. No. 210,982 filed Nov. 28, 1980, now U.S. Pat. No. 4,307,560 titled "Header Height Position Control For A Cotton Harvester" and application Ser. No. 210,983 filed Nov. 28, 1980, now U.S. Pat. No. 4,327,540 titled "Header Height Control For A Cotton Harvester".

BACKGROUND OF THE INVENTION

1. Field of the Invention

This invention is concerned with crop harvesting machines having front mounted header units for gathering a crop. The specific invention is related to a hydraulic control system incorporating a rotary flow divider to balance the raising and lowering action of independently suspended header units. Individual header unit height is controlled through ground elevation variation sensing devices for each independent header unit.

2. Description of the Prior Art

Crop harvesting vehicles, specifically cotton harvesters, that is both cotton strippers and cotton picking machines, are known to be equipped with front mounted gathering units or header units that will remove the cotton crop from the plants as the cotton harvester moves through the field. The automatic height sensing devices now in use incorporate a ground sensing shoe that is connected through a linkage to a header unit lift valve. The header unit lift valve is an open or closed valve that will supply hydraulic fluid under pressure to the cylinder associated with the header unit whereby extension of the cylinder rod will cause the header unit to be raised or lowered responsive to the ground elevation plane.

SUMMARY OF THE INVENTION

A cotton harvester with a plurality of front mounted crop gathering and harvesting headers is provided with a hydraulic circuit and control system that improves the ability of the header units to follow the ground contour over which the cotton harvester is being driven. Each harvesting unit or header unit is a self contained unit independently controlled to be raised and lowered responsive to the undulations in the terrain over which the cotton harvester is being driven while harvesting. The cotton harvester includes a source of hydraulic fluid, typically a hydraulic pump, which is used to provide fluid under pressure to raise the header units while the weight of the unit will cause a discharge of fluid from the associated header unit cylinder when the fluid source is diverted through the manual indexing of a control valve.

The hydraulic fluid will be delivered to the header units through a manual control valve that will be operated when it is desired that all header units be raised or lowered in unison. The manual control valve also has a position to allow the individual header units to be raised or lowered independently depending on ground plane variation. Between the manual control valve and the header units there is a rotary flow divider having typically one fluid distribution pump/motor for each header unit of the cotton harvester.

A terrain responsive valve is associated with each header unit and will allow the metered opening of the return line port of the hydraulic cylinder associated with that particular header unit. In a first embodiment of this invention a pair of check valves one being non-piloted and a second being a pilot operated check valve are interposed between the manual control valve and the header unit cylinders and/or rotary flow divider. In a second embodiment four check valves are used in fluid lines again between the manual control valve and the rotary flow divider and/or the header unit lift cylinders. It is among the objects of this invention to provide a cotton harvester header unit control system that will allow the raising and lowering of the header units at a uniform rate when the manual control valve of the units is effected by the harvester operator to either raise or lower the header units.

It is also an object of the invention to provide a hydraulic system for a cotton harvester having drop restrictor limits to control the rate of drop of the header units.

It is a further object of the invention to provide for continuous independent adjustments of each header unit while having the ability to raise all the header units simultaneously at the command of the vehicle operator. Each row unit has a height sensing shoe that follows the contour of the ground and automatically keeps each header unit working at a predetermined optimum stripping height. This relieves the operator of constantly riding the height control levers to maintain the proper stripping height while assuring the operator of getting more cotton with minimum dirt and trash.

Another feature of the header units is that they automatically return to the preset stripping height after the unit has been raised. The operator can override the ground sensing system at any time to raise all the units simultaneously to cross a waterway or to turn around at the end of the crop rows.

BRIEF DESCRIPTION OF THE DRAWING FIGURES

The above objects and advantages of this invention will be apparent from a careful perusal of this specification in conjunction with an examination of the drawing figures wherein:

FIG. 1 is a pictorial view of a cotton harvester having a portion of one header unit removed to expose the header unit lift cylinder;

FIG. 2 is a hydraulic schematic showing a preferred embodiment of the invention;

FIG. 3 is a hydraulic schematic similar to that shown in FIG. 2 having accessory transport restrictors incorporated;

FIG. 4 is a hydraulic schematic of an alternative embodiment; and

FIG. 5 is a hydraulic schematic of the embodiment shown in FIG. 4 having transport restrictors added to the hydraulic circuit.

DETAILED DESCRIPTION OF THE INVENTION

FIG. 1 shows a typical cotton harvester, generally 10, having an operator's compartment 12 and a crop retention basket 14 into which the harvested cotton is delivered.

A crop gathering device generally 16 is carried on the front portion of the cotton harvester and is comprised of a plurality of header units such as 20. In the embodiment illustrated four header units are shown, each unit delivering its harvested product through a delivery chute 22 for eventual accumulation in the crop retention basket 14.

Each header unit 20, more commonly a stripper unit on the stripper type cotton harvester shown, is a brush roll type unit. There may be a plurality of header units per machine with a cross auger connecting the header units. The stripping units consist of two stripper rolls arranged generally parallel to each other, of alternating rubber flaps and nylon brushes, drive gear boxes and shafts.

In the stripper operation the machine is driven through the cotton field causing cotton plants to enter the front of the header units where they are positioned and gathered by the gatherers. The brush rolls strip the cotton plant of the open cotton as well as of the green bolls. The harvested material is then conveyed to the cross auger by the header unit augers where it is moved from each header unit to the center chute 22 by the cross auger and delivered to an air stream. The cotton is separated from trash by the air stream and is blown into the crop retention basket while the green bolls fall into a boll box.

The invention is concerned with the hydraulic system used to raise and lower the header units as the cotton harvester is driven through the field. Also control of the header units to raise them all and lower them all in unison is part of this invention.

As can be seen a source of fluid pressure is provided by the variable displacement pump 24 that draws hydraulic fluid from a reservoir 26. The variable displacement pump 24 is of such capacity to enable it to provide total flow requirements of all the header units during simultaneous movements. A manually controlled three position valve is interposed between the variable displacement pump 24 and the rotary flow divider generally 30. The variable displacement pump could be a fixed displacement pump that could be used interchangeably depending on the nuances of engineering design.

The manual control valve generally 32 could be any type of three position valve, but the embodiment shown includes a neutral section 34 that passes pump output directly to the reservoir 26 in a first position represented by valve section 36. The pump will draw hydraulic fluid from the reservoir 26 and deliver it through first work port 40 to first delivery conduit 42, first lockout check valve 44 to the rotary flow divider generally 30. The rotary flow divider generally 30 is mounted downstream from the manual control valve either on the crop harvesting vehicle or alternatively on the crop gathering device that incorporates the individually mounted header units. The hydraulic fluid flow from the variable displacement pump 24 is delivered to the conduit manifold 46 of the rotary flow divider generally 30 where the hydraulic fluid is equally divided by the equal displacement sections in the rotary flow divider. Hydraulic fluid is subsequently distributed onto each of the header unit lift cylinders.

The rotary flow divider generally 30 used in the preferred embodiment illustrated is a gear type unit having a conduit manifold 46, four gear pumps 50, 52, 54 and 56 interconnected by means of a common shaft 60 and four fluid outlet ports 62, 64, 66 and 68. The rotary flow divider generally 30 is a hydraulic fluid control device having multiple equal displacement segments. As stated, each segment is made up of a gear type or vane type fluid transfer device that can act either as a pump or a motor depending on flow through the rotary flow divider and the pressure at the outlet ports of the rotary flow divider. The pump elements are interconnected to each other on the common shaft 60 to rotate synchronously. The volume of fluid flowing through the rotary flow divider will always be equalized, although the pressure at one or more of the orifices may be intensified.

A typical rotary flow divider is shown in U.S. Pat. No. 2,949,924 issued to A. M. Cochran, Jr. A pair of vane type fluid transfer devices are used in the Cochran invention although gear type—as used in gear type hydraulic pumps—are also used in rotary flow dividers. Each fluid transfer device or segment is capable of functioning as a bi-directional pump when the shaft 60 is rotated and capable of functioning as a bi-directional motor when flow of hydraulic fluid is directed therethrough. The outlet ports 50, 52, 54 and 56 are connected through lift cylinder supply lines 70, 72, 74 and 76 to independent single acting lift cylinders 80, 82, 84 and 86. Each lift cylinder is pivotally mounted between the crop gathering device and one of each of the independently pivoted header units. All the lift cylinders are similar with each having hydraulic ground elevation sensing units 86, 88, 90 and 92.

Each hydraulic ground elevation sensing unit includes a lift cylinder check valve 94 interposed in the lift cylinder supply line such as 70 that can pass fluid from the rotary flow divider generally 30 to the lift cylinder such as 80. A metering orifice 96 of fixed capacity is connected in parallel with the lift cylinder check valve 94 and allows fluid to flow in either direction but will create a pressure drop when fluid flows from the single acting lift cylinder 80 as the lift cylinder check valve 94 will be seated.

For simplification of the discussion in the preferred embodiment only one lift cylinder and hydraulic ground elevation sensing unit will be described in detail. Of the four single acting lift cylinders and hydraulic ground elevation sensing units presented, all are identical in function and operating method.

Connected in parallel with each lift cylinder such as 80 and part of the hydraulic ground elevation sensing unit 90, is a variable orifice valve assembly 100 comprised of a ground variation sensor 102 (symbolically represented, but more typically including a ground contact plate hinged to the header unit to follow the contour of the ground) directly linked to, for instance, the spool of the variable orifice valve assembly 100. The variable orifice valve assembly could be one of several types of variable orifice valves with a preferred embodiment shown.

Concerned only with the operation of one single acting lift cylinder 80 and its hydraulic ground elevation sensing unit 86, it can be seen that as hydraulic fluid is supplied from outlet port 62 of the rotary flow divider generally 30 the hydraulic system will attempt to balance the weight of the associated crop gathering unit hinged to the front of the cotton harvester. As the machine moves forward through the cotton field, the hydraulic ground elevation sensing unit 86 will ride up and down over the undulations of the ground. The variable orifice valve assembly 100 will be adjusted to increase or decrease its flow capacity thus generating sufficient back pressure from the fixed flow as generated from the rotary flow divider. When a rise in terrain is sensed, or a temporary obstruction encountered, the ground variation sensor 102 will swing down opening the variable orifice valve assembly 100, the variable pressure behind the variable orifice valve assembly decays and the weight of the gathering unit pivoting around its hinged attachment to the header assembly forces some hydraulic fluid out through the orifice thus causing the gathering unit to repose at a new balanced position.

Upstream of the rotary flow divider generally 30 and incorporated in the housing of the manual control valve generally 32 are located a plurality of check valves in addition to the first lockout check valve 44. A second lockout check valve 104 is pilot operated to open when said first delivery conduit 42 is pressurized. The second lockout check valve 104 is located in return line 106 which extends from the manual control valve generally 32 to each of the hydraulic ground elevation sensing units 86, 88, 90 and 92 via discharge conduits respectively 110, 112, 114 and 116. A third check valve 120 is interposed in branch 122 linking the return line 106 to the first delivery conduit 42. The third check valve allows fluid flow from the return line 106 to the first delivery conduit 42 when the pressure in line 146 is greater than that in first delivery conduit 42. A fourth check valve 124 is interposed in return line 106 upstream from both the third check valve 120 and the second lockout check valve 104 and downstream from the discharge conduits 110, 112, 114 and 116.

The advantage of using the rotary flow divider generally 30 is that all of the crop gathering header units will receive hydraulic fluid at an equal rate when necessary and no single unit will dominate or take preference over the others. As the variable orifice valve assemblies such as 100 are always open to some degree when the cotton harvester is being driven through a field with the header units lowered, the rotary flow divider gear pump segments will always be turning. If one of the single acting lift cylinders 80, 82, 84 or 86 has balanced its load, hydraulic fluid in the conduit manifold 46 will still continue to the outlet port (and the rotary flow divider segment) with the least back pressure. The flow requirement at this outlet port will then be satisfied rapidly without depriving its mates of fluid flow. When all the header units are balanced, the excess flow will be evenly distributed and exhausted through the open variable orifices. If all the header units, specifically their associated ground variation sensors 102 encounter a depression or an obstruction in the ground elevation they will all fall or rise at the same rate.

During normal harvesting operations the manual control valve generally 32 is placed in the detent position whereby first position valve section 36 is aligned with the first delivery conduit 42 to provide fluid thereto. The hydraulic fluid flow leaves the work port 40 of the detented valve and passes on to the inlet of the rotary flow divider where it is hydraulically communicated to the conduit manifold 46. The pressure developed at work port 40 operates the second lockout check valve 104 to open. Check valve 120 between the first delivery conduit 42 and the return line 106 will remain closed because the pressure differential is higher at this time on the first delivery conduit side. The pump flow continues through the rotary flow divider and on through the variable orifice 126, for instance, of the variable orifice valve assembly 100. The pump 24 will continue to deliver fluid under pressure and as the pressure rises in each single acting lift cylinder 80, 82, 84 and 86, higher than the balance pressure, the header units such as 20 will rise to the top of the lift cylinder stroke. The return flow from the variable orifices such as 126 is passed through the discharge conduits such as 110 to the common return line 106 and through the fourth or free flow side check valve 124. The hydraulic flow then passes into the segment of the return line 106 incorporating the second lockout check valve 104, which has been pilot operated to open, thence to the manual control valve generally 32 and ultimately to the reservoir 26. When the machine reaches the end of the crop row or is to be transported on a service road the three position manual control valve generally 32 is positioned to energize the second work port 130 with the manual control valve in a non-detented third or cylinder raise position. Hydraulic fluid flow leaves work port 130 and cannot pass through the fourth check valve 124. The hydraulic fluid is therefore diverted through the free flow direction of the third check valve 120. The hydraulic flow cannot pass through the first lockout check valve 44 as it is not pilot operated to open; therefore the fluid proceeds into the rotary flow divider conduit manifold 46 again as in the normal harvesting operation.

Due to the back pressure generated at the third check valve 120 and across the rotary flow divider elements 50, 52, 54 and 56 the fourth check valve 124 cannot open. Therefore all the hydraulic fluid flow uniformly distributed by the rotary flow divider generally 30 is supplied to the single acting lift cylinders 80, 82, 84 and 86. These cylinders, each receiving the same volume of fluid independently of pressure because the divider divides their flow evenly, will raise the header units at a uniform rate until they reach the end of the piston stroke.

Due to volumetric tolerances of the rotary flow divider generally 30 or the individual single acting lift cylinders one or more of the cylinders may not reach the top simultaneously. The remaining flow from those single acting lift cylinders that have been fully extended will be added to those cylinders still moving and requiring fluid. This flow will be back fed through the downstream side of the variable orifices such as 126 until all the single acting lift cylinders are fully extended. When the header units have all been raised the operator will release the manual control valve lever. The header units will be hydraulically locked in the up position between the first lockout check valve 44 and the second lockout check valve 104.

It should be pointed out that in the FIG. 2 embodiment the lift cylinder check valve 94 and the metering orifice 96 operate as a free raise drop restrictor that allows the cylinder to be pressurized at an uninhibited rate. However, it will control the drop rate of the header unit by metering the rate at which fluid can be pumped out of the respective associated cylinders.

FIG. 3 presents a modified embodiment of the hydraulic system shown in FIG. 2. Modification includes the use of transport restrictors in the hydraulic circuit. The manual control valve generally 32, all the check valves 44, 104, 120, 124, the single acting lift cylinders 80, 82, 84 and 86, the hydraulic ground elevation sensing units 86, 88, 90 and 92 as well as all the hydraulic lines shown in FIG. 2 are identically used in the embodiment shown in FIG. 3. Furthermore the operation of the device in FIG. 3 is substantially the same as the operation of the device of FIG. 2.

The transport restrictors 132, 134, 136 and 138 are interposed in discharge conduits 110, 112, 114 and 116. Each transport restrictor is identical and incorporates a fixed orifice such as 140 and a transport restrictor check valve such as 142. The transport restrictor valve of each transport restrictor will allow unimpeded fluid flow from the hydraulic ground elevation sensing unit such as 86 to the return line 106, but will impede hydraulic fluid flow in a reverse direction from return line 106 back through the associated discharge conduits. The transport restrictor fixed orifices such as 140 will create a pressure drop when the header units are being lifted to a transport position. When the vehicle operator puts the manual control valve generally 32 such that the second work port 130 is pressurized and if at that time one of the header units is slightly higher than its mates, then that higher header unit will raise to the uppermost extent of its travel prior to the other header units. Without the transport restrictor the header units that still are being raised will raise at a faster rate as the hydraulic fluid being supplied to the already raised header unit will be shunted back through the hydraulic ground elevation sensing unit to the other single acting lift cylinders. The transport restrictor will constrict the rate of fluid entering the hydraulic ground elevation sensing unit from the back side such that the raise rate of the single acting lift cylinders still being raised will not be drastically accelerated. The relatively small orifice of the transport restrictor fixed orifice 140 for instance will prevent rapid flow from one cylinder to the back side of another, thus the raise rate will be uniform and one cylinder won't get ahead of the others.

FIG. 4 shows a third embodiment similar to the embodiment shown in FIG. 2 with differences being in the manual control valve and the number of check valves incorporated in the hydraulic system. The rotary flow divider generally 30 as well as the single acting lift cylinder 78, 80, 82 and 84 and the hydraulic ground elevation sensing units 86, 88, 90 and 92 are the same as those shown in FIG. 2. The fluid delivery line 144 and the fluid return line are different from the embodiment shown in FIG. 2 in that the fluid delivery line 144 is directly connected between the control valve generally 150 and the rotary flow divider generally 30. The fluid delivery line 144 incorporates a first lockout check valve 44 and also incorporates a pilot line directed to a second lockout check valve 104. The control valve generally 150 has a first position valve section 36 and a neutral section 34 identical with the manual control valve generally 32. The third section of the control valve generally 150 incorporates a work port 154 that will pass hydraulic fluid from the pump 24 to the fluid return line 146 when the control valve generally 150 is displaced to the position where the third section of the control valve is aligned with the fluid delivery line 144 and the fluid line 146. Only the pump source port 156 and the supply port 154 allow the passage of fluid through the third section 152 of the control valve. The four other available ports are blocked in this third section of the control valve 152. Since the first position valve section 36 of the control valve generally 150 is the same as that shown in the embodiment represented by FIG. 2, the operation of the hydraulic system when the control valve generally 152 is deployed to this first position will be identical to the operation of the device set forth in FIG. 2 when the header units are in a detented automatic ground sensing/raising and lowering mode. However, when the control valve generally 150 is displaced to the third section of the control valve 152, the operation will be somewhat different as neither the third check valve 120, the hydraulic branch 122 or the fifth check valve 124 are in the embodiment shown by FIG. 4. The control valve generally 150 is designed to block any reverse flow through the spool valve as the only available passage is that from the pump source port 156 to the supply port 152 and the pressure of fluid being supplied by the valve 104. The control valve generally 150 has a first position valve section 36 and a neutral section 34 identical with the manual control valve generally 32. The third section of the control valve generally 150 incorporates a work port 154 that will pass hydraulic fluid from the pump 24 to the fluid return line 146 when the control valve generally 150 is displaced to the position where the third section of the control valve is aligned with the fluid delivery line 144 and the fluid line 146. Only the pump source port 156 and the supply port 154 allow the passage of fluid through the third section 152 of the control valve. The four other available ports are blocked in this third section of the control valve 152. Since the first position valve section 36 of the control valve generally 150 is the same as that shown in the embodiment represented by FIG. 2, the operation of the hydraulic system when the control valve generally 152 is deployed to this first position will be identical to the operation of the device set forth in FIG. 2 when the header units are in a detented automatic ground sensing/raising and lowering mode. However, when the control valve generally 150 is displaced to the third section of the control valve 152, the operation will be somewhat different as neither the third check valve 120, the hydraulic branch 122 or the fifth check valve 124 are in the embodiment shown by FIG. 4. The control valve generally 150 is designed to block any reverse flow through the spool valve as the only available passage is that from the pump source port 156 to the supply port 152 and the pressure of fluid being supplied by the variable displacement pump 24 will always exceed the pressure in fluid return line 146 thus keeping the second lockout check valve unseated as long as flow exists while at least one of the single acting lift cylinders is being extended. Upon full extension of all the single acting lift cylinders no more fluid will be supplied at the supply port 154 from the variable displacement pump 24. Thus the second lockout check valve will be seated and the header units will be hydraulically locked in a raised position with all the hydraulic cylinders fully extended.

FIG. 5 shows an embodiment that is a variation of the embodiment shown by FIG. 4 wherein the control valve generally 150, the rotary flow divider generally 30, the single acting lift cylinders 78, 80, 82 and 84, the hydraulic ground elevation sensing units 86, 88, 90 and 92 as well as the connecting hydraulic lines and conduits are all similar with the exception of the utilization of transport restrictors 132, 134, 136 and 138. These transport restrictors will operate in the same manner as those shown in the embodiment represented by FIG. 3.

That is each transport restrictor valve of each transport restrictor will allow fluid flow from the hydraulic ground elevation sensing unit such as 86 to the return line 106 but will be closed upon hydraulic fluid flow in a reverse direction from return line 106 back thhrough the associated discharge conduits. The transport restrictor fixed orifices will create a pressure drop when the header units are being lifted to a transport position and the transport restrictor will constrict the rate of fluid entering the hydraulic ground elevation sensing unit from the back side such that the raise rate of the single acting lift cylinders still being raised will not be drastically accelerated.

Thus it can be shown that there has been provided a header unit lifting and raising circuit for use on a cotton harvester that meets the aims and advantages set forth above. Four embodiments of the invention have been described above, however the inventor contemplates that various nuances of design are possible and such design nuances as fairly fit within the broad scope of the appended claims are contemplated.

What is claimed is:

1. In a crop harvesting machine having a crop gathering device including header units independently pivoted to said crop gathering device, the improvement comprising:
   a source of hydraulic fluid and a hydraulic fluid reservoir available to said crop harvesting vehicle;
   a manual control valve hydraulically communicating with said source of hydraulic fluid;
   a rotary flow divider having a plurality of rotary flow divider output ports, said rotary flow divider providing equalized fluid delivery to said output ports, said rotary flow divider hydraulically communicating via a first delivery conduit with said manual control valve;
   a plurality of independent single acting lift cylinders, one of each of said cylinders pivotally mounted between said crop gathering device and one of each independently pivoted header units for allowing the raising of said header units;
   a first lockout check valve (44) in said first delivery conduit allowing flow from said manual control valve to said rotary flow divider;
   a return line (106) providing hydraulic communication between said manual control valve and each of said single acting lift cylinders;
   a second lockout check valve (104) in said return line normally preventing flow through said return line from said single acting lift cylinders to said manual control valve in communicating with said first delivery conduit, but effective to be pilot operated to allow flow when said first delivery conduit is pressurized; and
   a plurality of hydraulic ground elevation sensing units, one of said ground elevation sensing units interposed between each of said single acting lift cylinders and said return line, each of said hydraulic ground elevation sensing units having a variable orifice valve assembly and a ground variation sensor associated therewith for sensing ground plane undulations and for affecting adjustment of said variable orifice valve assembly in response to ground plane undulations whereby said single acting lift cylinders will be supplied with fluid when said ground variation sensor directs said variable orifice valve assembly to be adjusted responsive to the ground plane.

2. The invention in accordance with claim 1 wherein said manual control valve is a self centering manual control valve having a detented first position allowing fluid flow from said source of hydraulic fluid to said first delivery conduit and from said return line to said hydraulic fluid reservoir;
   said manual control valve having a neutral section; and
   said manual control valve having a non-detented third section allowing fluid flow from said source of hydraulic fluid to said return line and preventing fluid flow from said first supply conduit.

3. The invention in accordance with claim 2 wherein said return line includes said second lockout check valve being pilot operated to open when said manual control valve is in said first position whereby flow in said return line is uninterrupted.

4. The invention in accordance with claim 2 wherein said manual control valve when positioned in said non-detented third position allows fluid flow from said source of hydraulic fluid to pass to said lift cylinders and said rotary flow divider while causing said first lockout check valve to be closed.

5. The invention in accordance with claim 2 wherein each of said variable orifice valve assemblies will be adjusted responsive to said ground variation sensor to provide maximum restriction when said ground variation sensor indicates a rising ground plane whereby pressure will build on said rotary flow divider side of said variable orifice valve assembly pressuring said lift cylinder and diverting said flow raising said header units and wherein each of said variable orifice valve assemblies will be adjusted responsive to said ground variation sensor to provide minimum restriction when said ground variation sensor indicates a decreasing ground plane whereby flow will be bled off on said rotary flow divider side of said variable orifice valve assembly causing said lift cylinder to lower the elevation of said header unit.

6. The invention in accordance with claim 2 wherein said variable orifice valve assemblies each comprise:
   a lift cylinder check valve; and
   a metering orifice connected in parallel with said lift cylinder check valve both said lift cylinder check valve and said metering orifice located between said rotary flow divider output ports and said single acting lift cylinder upstream of said variable orifice valve assembly, said lift cylinder check valve allowing unrestricted fluid flow from said rotary flow divider to said independent single acting lift cylinder and said metering orifice creating a pressure drop when said hydraulic fluid flows from said single acting lift cylinder to said variable orifice valve assembly.

7. The invention in accordance with claim 2 wherein said rotary flow divider pump elements are gear pumps.

8. The invention in accordance with claim 2 wherein said rotary flow divider pump elements are vane type pumps.

9. In a crop harvesting machine having a crop gathering device including header units independently pivoted to said crop gathering device, the improvement comprising a source of hydraulic fluid (24) and a hydraulic fluid reservoir (26) available to said crop harvesting machine;
   a manual control valve (32) hydraulically communicating with said source of hydraulic fluid;
   a rotary flow divider (30) having a plurality of rotary flow divider output ports, said rotary flow divider providing equalized fluid delivery to said output ports, said rotary flow divider hydraulically communicating via a first delivery conduit (42) with said manual control valve;
   a plurality of independent single acting lift cylinders (78), one of each of said cylinders pivotally mounted between said crop gathering device and one of each independently pivoted header units for allowing the raising of said header units;
   a first lockout check valve (44) in said first delivery conduit allowing flow from said manual control valve to said rotary flow divider;

a return line (106) providing hydraulic communication between said manual control valve and each of said single acting lift cylinders;

a second lockout check valve (104) in said return line normally preventing flow through said return line from said single acting lift cylinders to said manual control valve in communicating with said first delivery conduit to be pilot operated to allow flow when said first delivery conduit is pressurized; and a plurality of hydraulic ground elevation sensing units (86), one of said ground elevation sensing units interposed between each of said single acting lift cylinders and said return line, each of said hydraulic ground elevation sensing units having a variable orifice valve assembly and a ground variation sensor associated therewith for sensing ground plane undulations and for effecting adjustment of said variable orifice valve assembly in response to ground plane undulations whereby said single acting lift cylinders will be supplied with fluid when said ground variation sensor directs said variable orifice valve assembly to be adjusted responsive to the ground plane;

said manual valve (32) and return line (106) characterized wherein:

said manual control valve is a self-centering manual control valve having a detented first position allowing fluid flow from said source of hydraulic fluid to said first delivery conduit and from said return line to said hydraulic fluid reservoir;

said manual control valve having a neutral section;

said manual control valve having a non-detented third position (130) allowing fluid flow from said source of hydraulic fluid to said return line and connecting said first delivery conduit to said reservoir; and said return line is hydraulically connected by a branch (122) to said first delivery conduit between said first lockout check valve and said rotary flow divider, said branch having a third check valve allowing flow from said return line to said first delivery conduit when open; and said return line having a fourth check valve (124) between said branch and said hydraulic ground elevation sensing units allowing flow from said ground elevation sensing units when open.

10. The invention in accordance with claim 9 wherein said second lockout check valve is pilot operated to open when said manual control valve is in said first position, said third check valve will be closed and said fourth check valve will be open; and wherein said second lockout check valve will be open when said manual control valve is in said third position, said third check valve will be open and said fourth check valve will be closed whereby hydraulic fluid will flow from said source of fluid to said rotary flow divider.

11. The invention in accordance with claim 9 wherein each of said variable orifice valve assemblies will be adjusted responsive to said ground variation sensor to provide maximum restriction when said ground variation sensor indicates a rising ground plane whereby pressure will build on said rotary flow divider side of said variable orifice valve assembly pressurizing said lift cylinder and diverting said flow raising said header units and wherein each of said variable orifice valve assemblies will be adjusted responsive to said ground variation sensor to provide minimum restriction when said ground variation sensor indicates a decreasing ground plane whereby flow will be bled off on said rotary flow divider side of said variable orifice valve assembly causing said lift cylinder to lower the elevation of said header unit.

12. The invention in accordance with claim 9 wherein said variable orifice valve assemblies each comprise:

a lift cylinder check valve; and a metering orifice connected in parallel with said lift cylinder check valve, both said lift cylinder check valve and said metering orifice located between said rotary flow divider output port and said single acting lift cylinder upstream of said variable orifice valve assembly, said lift cylinder check valve allowing unrestricted fluid flow from said rotary flow divider to said independent single acting lift cylinder and said metering orifice creating a pressure drop when said hydraulic fluid flows from said single acting lift cylinder to said variable orifice valve assembly.

13. The invention in accordance with claim 9 wherein said rotary flow divider pump elements are gear pumps.

14. The invention in accordance with claim 9 wherein said rotary flow divider pump elements are vane type pumps.

15. The invention in accordance with claim 9 wherein a plurality of transport restrictors are interposed between said return line and one of each of said hydraulic ground elevation sensing units, said transport restrictors allowing unimpeded fluid flow from said ground elevation sensing units through said return line and impeding fluid flow from said return line to said hydraulic ground elevation sensing units.

* * * * *